May 16, 1967  R. D. STACK  3,319,579
FLUID FLOW PUMP AND BOOSTING APPARATUS
Filed May 10, 1965
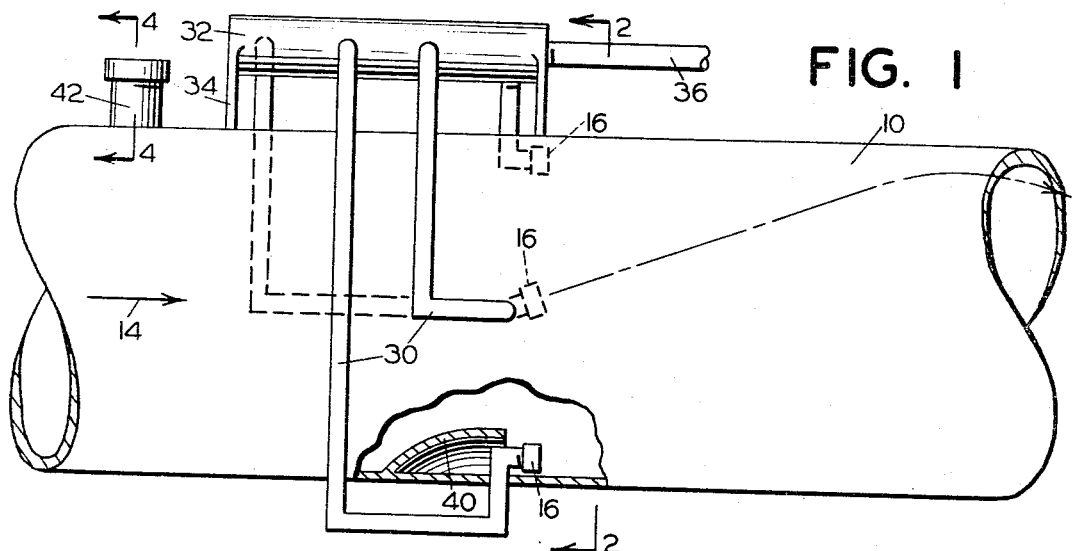
FIG. 1
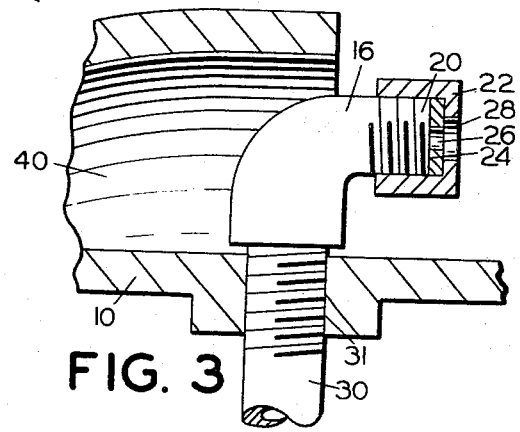
FIG. 3
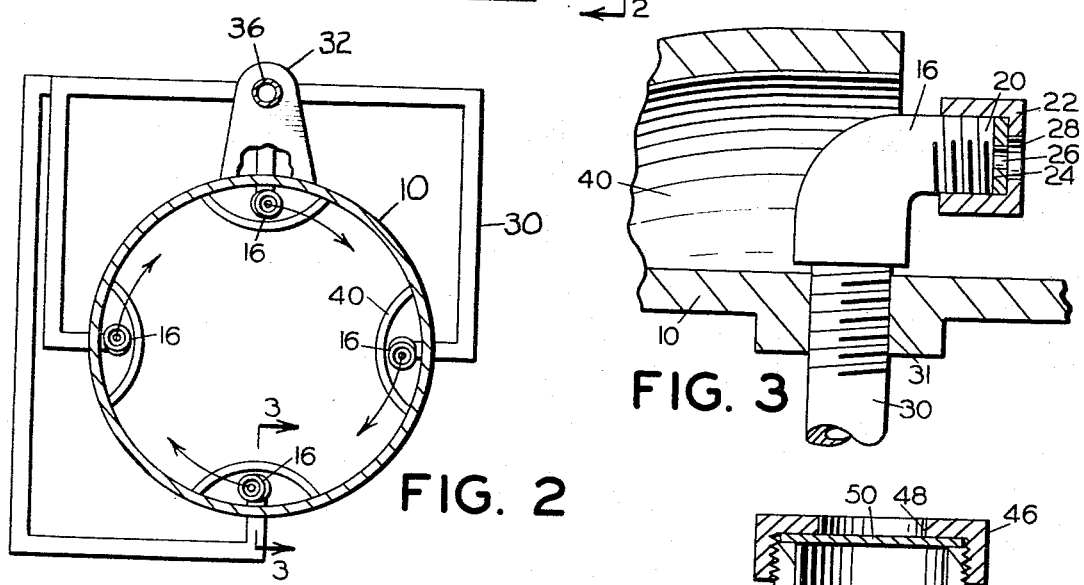
FIG. 2
FIG. 5
FIG. 4
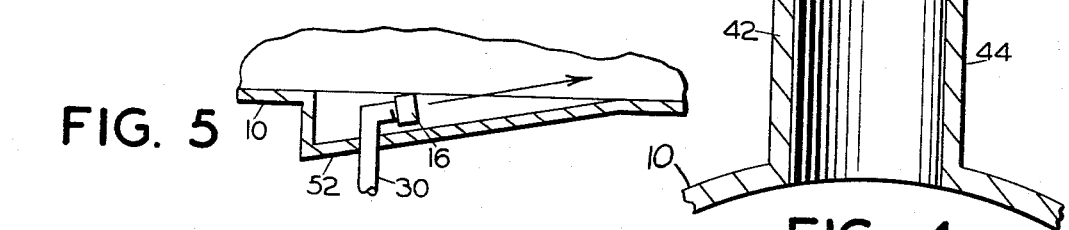
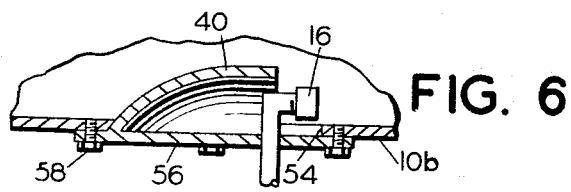
FIG. 6
INVENTOR.
RONALD D. STACK
BY Eugene M. Eckelman
ATTORNEY United States Patent Office 3,319,579
Patented May 16, 1967

3,319,579
FLUID FLOW PUMP AND BOOSTING APPARATUS
Ronald D. Stack, 18323 SE. Stark,
Portland, Oreg. 97233
Filed May 10, 1965, Ser. No. 454,347
1 Claim. (Cl. 103—263)

This invention relates to a new and novel fluid flow pump and boosting apparatus, and more particularly pertains to a boosting apparatus arranged to be associated with a pump and located in a pipe which carries fluid away from the pump.

The primary objective of the present invention is to provide fluid flow boosting apparatus of the type described which utilizes one or more nozzles located in the pipe through which compressed air is ejected, and more particularly to provide one or more nozzles which are disposed adjacent to the inner side surfaces of the pipe and are directed angularly relative to the axis of the pipe for imparting a spiral action to the fluid.

Another object is to provide a novel nozzle construction and arrangement for imparting the spiral action to the fluid, and further yet to utilize baffle means in combination with the nozzles for protecting the latter from moving particles in the fluid being pumped.

Still another object is to provide a novel pipe construction for fluid flow and an air nozzle wherein the pipe is provided with a recess to receive the nozzle and hold the nozzle out of the plane of the main fluid flow in the pipe.

Yet another object is to provide a fluid flow boosting apparatus utilizing a vacuum relief valve mounted on the pipe between the pump and air nozzles.

Briefly stated the invention employs in combination with a pipe for fluid flow one or more nozzles which are mounted interiorly of the pipe adjacent to the inner wall thereof and directed in the direction of fluid flow. More particularly, these nozzles are disposed at acute angles relative to the axis of the pipe for the purpose of imparting a spiral motion to the fluid in the boosting action. The nozzles are associated with compressor means and suitable conduits for supplying compressed air to the nozzles. Furthermore the invention employs vacuum relief means mounted on the pipe and disposed between the pump and the nozzles whereby to release vacuum in the pipe in the event of a stoppage in the pump or pipe on the upstream side of the nozzles.

The invention will be better understood and additional objects will become apparent from the following specification and claims, considered together with the accompanying drawings, wherein the numerals of reference indicate like parts.

FIGURE 1 is a side elevational view of a pipe and of fluid flow boosting apparatus installed in the pipe, a portion of the pipe being broken away;

FIGURE 2 is a cross sectional view taken on the line 2—2 of FIGURE 1;

FIGURE 3 is an enlarged, fragmentary sectional view taken on the line 3—3 of FIGURE 2;

FIGURE 4 is an enlarged, fragmentary sectional view taken on the line 4—4 of FIGURE 1;

FIGURE 5 is a view taken similar to FIGURE 3 but showing a modified construction of nozzle support; and FIGURE 6 also is a view similar to FIGURE 3 but showing a further form of nozzle mounting.

Referring in particular to the drawings, the numeral 10 designates a pipe, comprising the outflow or discharge pipe from a pump not shown. For the purpose of illustration it will be assumed that the forced fluid flow from the pump is in the direction of arrow 14.

In accordance with the present invention a plurality of nozzles 16 are mounted interiorly of the pipe adjacent to the inner walls thereof. Four of such nozzles, as shown, have been found to impart the desired fluid boosting effect desired which, as will be seen hereinafter, comprises a spiral motion imparted to the fluid.

As best seen in FIGURES 1 and 2, the nozzles are directed at an acute angle relative to the axis of the pipe. More specifically, although the nozzles are directed generally in the direction of fluid flow they are angled a small amount to impart such spiral motion to the fluid. To illustrate clearly the angle at which the nozzles are directed, it will be seen in FIGURE 2 that the left hand nozzle 16 is turned upwardly, the top nozzle is turned to the right, the right hand nozzle is turned downwardly and the bottom nozzle is turned to the left. Since the nozzles are pointed in the general direction of fluid flow but turned slightly, the said spiral effect will be produced. Although four nozzles are illustrated it is apparent that more or less may be utilized.

The construction of the nozzles 16 is shown in FIGURE 3, each of the nozzles comprising an L-shaped body terminating in a nozzle end 20 having a cap 22 threadedly mounted for supporting a disc 24 on the end thereof. The disc 24 has a central aperture 26. Cap 22 has an aperture 28 assuming an enlarged diameter relative to the diameter of the aperture 26. By means of the nozzle construction just described, discs 24 may be provided with different sized apertures 26, whereby the output from the nozzles 20 may be controlled by insertion of a desired disc.

The nozzles 16 are threadedly mounted on the ends of conduits 30 which project through suitable apertures 31 in the wall of the pipe and which lead from a manifold or air chamber 32 secured to the pipe such as by supporting legs 34. Air chamber 32 is connected with a suitable conventional air compressor, not shown, by conduit means 36.

Integrated with the inner surface of the pipe adjacent to the nozzles 16 and on the upstream side thereof are transversely curved baffles 40. In addition to being transversely curved, these baffles are curved longitudinally and serve to direct any coarse particles in the fluid inwardly toward the center of the pipe an amount sufficient to prevent impingement of said particles on the nozzles. Thus, the nozzles will not be worn or otherwise damaged by particles in the fluid.

With reference to FIGURES 1 and 4, a vacuum release valve 42 is mounted on the pipe intermediate the pump and the present booster apparatus. This valve comprises an upstanding hollow body portion 44 communicating with the interior of the pipe and having a cap 46 threadedly mounted thereon. The cap 46 is provided with an aperture 48 and is arranged to clamp a rupturable disc 50 on the top edge of the body portion 44. In the boosting operation caused by the ejection of compressed air from the nozzles, a vacuum will develop on the upstream sides of the nozzles. Such vacuum comprises a normal condition, and the pipe and other parts are designed to withstand such vacuum. The purpose of the vacuum release valve 42, however, is to prevent collapse of pipe 10 in the event that any vacuum condition in the pipe should overcome the collapsible strength of the pipe, which may happen when the pipe or pump becomes plugged. The disc 50 is of selected strength whereby to be ruptured by the vacuum condition prior to any possibility of damage to the pipe.

Referring now to the modified form of FIGURE 5, instead of utilizing the baffles 40, as in FIGURE 1, the pipe 10a is provided with outwardly projecting recessed portions 52 and the nozzles are seated in these recesses. In this structure, the nozzles are disposed out of the main flow of fluid in the pipe, and therefore will not be damaged by coarse particles in the fluid.

FIGURE 6 shows another form of nozzle mounting wherein the pipe 10b has cut out portions 54 and the nozzles 16 and baffles 40 are secured to a plate 56 releasably secured to the pipe at the cut-out portions by means of bolts 58. By means of this particular structure ready access can be had to the nozzles and the baffles merely by removing the plates 56.

In the operation of the present invention, compressed air is supplied to the nozzle 16 by a compressor which directs forced air into the distribution chamber 32 and through the conduits 30. Since the nozzles are angled relative to the axis of the pipe, they impart a spiral motion to the fluid flowing in the pipe. The fluid will be moved in such spiral motion some distance away from the booster apparatus, but then after a certain distance air bubbles from the nozzles enlarge and stabilize to give a powerful push to the fluid. It has been found that the air does not mix with the water, but instead, as stated, the air bubbles enlarge and stabilize to effect the boosting power. In fact the enlarged air bubbles will collect and cause pulsations to build up in the fluid.

It is to be understood that the present booster apparatus may be utilized in any section of pipe on the discharge side of the pump. It may be utilized for lifting fluid over an embankment or the like or for any other purpose in aiding a fluid pump. Furthermore, it is to be understood that once fluid is flowing in the pipe a sufficient vacuum is developed directly behind the nozzles to continue the flow of fluid even though the pump is shut off. Thus, in cases where priming is not necessary, the present booster may serve by itself as a pump.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

A fluid flow boosting apparatus in combination with a pipe having an aperture in its side wall and which pipe is arranged to carry fluid from a pump, comprising at least one nozzle projecting through said aperture in said pipe and secured to a plate member releasably secured to said pipe over said aperture, said nozzle having an outlet end disposed closely adjacent to the inner surface of said pipe, said nozzle being directed in the direction of fluid flow at an acute angle relative to the axis of said pipe, air compressor means associated with said nozzle for supplying compressed air to the latter, the compressed air being ejected from said nozzle causing said fluid to flow spirally in said pipe, and means secured to said plate member projecting radially inwardly through said aperture in said pipe wall, the outer end of said nozzle being partially covered by said inwardly projecting means so that said nozzle is protected from the particles in said fluid.

References Cited by the Examiner
UNITED STATES PATENTS

| | | | |
|---|---|---|---|
| 960,023 | 5/1910 | Knight | 103—232 |
| 1,250,680 | 12/1917 | Sheldon | 220—89 |
| 1,314,539 | 9/1919 | Rust | 103—232 |
| 2,000,762 | 5/1935 | Kraft | 103—267 |
| 2,061,032 | 11/1936 | Huff | 103—263 |
| 2,343,269 | 3/1944 | Aaron | 103—266 |
| 2,400,242 | 5/1946 | Malina et al. | 60—35.6 |
| 3,082,825 | 3/1963 | Hanner | 103—260 |
| 3,169,658 | 2/1965 | Porter | 220—89 |
| 3,175,571 | 3/1965 | Bankert | 137—13 |

DONLEY J. STOCKING, *Primary Examiner.*

MARK M. NEWMAN, *Examiner.*

W. J. KRAUSS, *Assistant Examiner.*